July 5, 1932.   L. E. LA BRIE   1,865,572
BRAKE
Original Filed Feb. 21, 1927
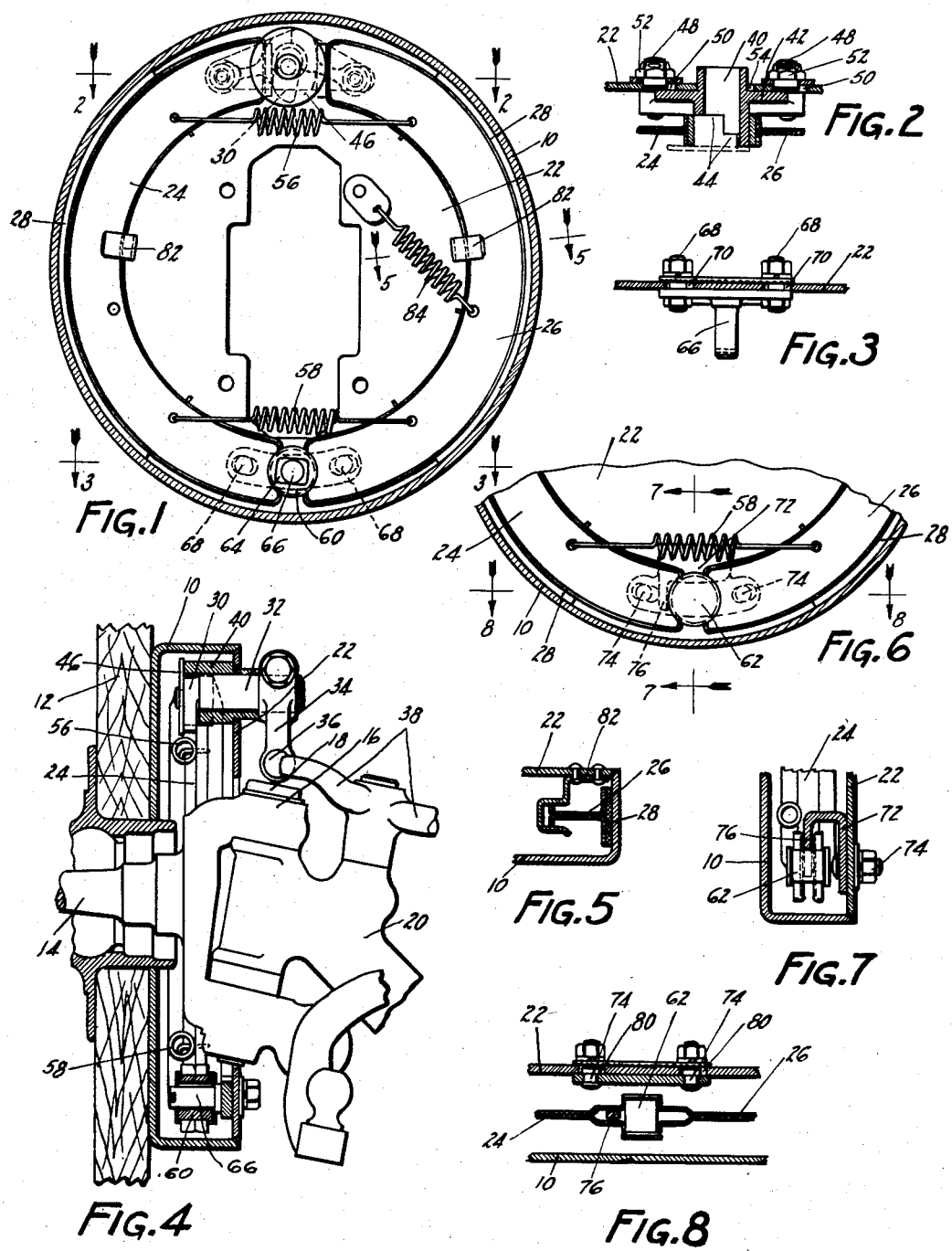
INVENTOR
LUDGER E. LA BRIE
BY
M. W. McConkey
ATTORNEY Patented July 5, 1932

1,865,572

UNITED STATES PATENT OFFICE

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS

BRAKE

Application filed February 21, 1927, Serial No. 169,878. Renewed April 7, 1931.

This invention relates to brakes, and is illustrated as embodied in an internal expanding automobile brake.

An important object of the invention is to secure maximum effectiveness in retarding forward vehicle movement, by arranging one shoe or the like to apply another, while shifting the anchorage to the connection between the shoes when the direction of movement is reversed. Preferably efficient action in reverse is secured by having one shoe act on the other through the cam or equivalent applying device.

Various features of novelty relate to forming the camshaft bearing as one of the torque-taking devices, to the specific form of the device for taking torque from the connected ends of the shoes, and to different novel and desirable details of construction which will be apparent from the following description of two illustrative embodiments shown in the accompanying drawing, in which:

Figure 1 is a vertical section through a brake embodying the invention, just inside the head of the brake drum, showing the brake shoes in side elevation;

Figure 2 is a partial section through the camshaft bracket and its support, on the line 2—2 of Figure 1;

Figure 3 is a partial section on the line 3—3 of Figure 1, showing one form of device for taking braking torque from the connection between the shoes;

Figure 4 is a vertical section through the brake, at right angles to Figure 1;

Figure 5 is a partial radial section through the brake, on the line 5—5 of Figure 1;

Figure 6 is a view corresponding to the lower part of Figure 1, but showing a different form of device for taking braking torque from the connection between the shoes;

Figure 7 is a section on the line 7—7 of Figure 6, showing the torque-taking device; and Figure 8 is a partial section on the line 8—8 of Figure 6, showing the relation of the torque-taking device to the shoes.

In the arrangement of Figures 1-5, the brake comprises a drum 10, rotating with a wheel 12 mounted on the spindle 14 of a knuckle 16 which is swivelled, by a king-pin 18 or the like, at the end of the front axle 20. A backing plate or other support 22, at the open side of drum 10, is secured in any desired manner to the knuckle 16.

Within the drum 10 is arranged a friction device engageable with the drum, and shown as including floating shoes 24 and 26. These shoes are shown as built up from two channel-shaped steel stampings riveted or welded back to back, with the outer flanges jointly forming a support for the brake lining 28.

The brake is applied by means such as a one-lobed cam 30 engaging shoe 24, and integral with or secured to a shaft 32 carrying a crank arm 34 engaged by an integral ball 36 on the end of a lever 38 pivoted on the axle 20. When the brake is applied, the center of ball 36 should be in or adjacent the axis of the king-pin 18.

Shaft 32 is journalled in a bearing 40, which is preferably an integral part of a support such as a bracket 42, the bearing being engaged by the end of shoe 26 to take the torque of both shoes when the drum is turning counter-clockwise in Figure 1 (i. e. when the car is moving forward), and being cut away at 44, as best shown in Figure 2, to permit cam 30 to engage shoe 24. The ends of the two shoes are shown confined between bracket 42 and a plate or washer 46 riveted or otherwise secured to the end of cam 30.

Bracket 42 carries studs or similar fastenings 48 projecting through slots 50 in the backing plate 22. Nuts 52, threaded on these fastenings, are formed with shoulders to prevent clamping the bracket to the backing plate, thus leaving it free to float. An opening 54 is also provided for bearing 40. Normally the fastenings 48 are in the left ends of slots 50, as shown, so that braking torque is taken from shoe 26, through bearing 40 and bracket 42, to the backing plate 22 through the fastenings 48. The upper ends of shoes 24 and 26 are urged away from the drum by a return spring 56.

The lower ends of shoes 24 and 26 are formed with semi-circular notches held by a spring 58 in engagement with opposite sides of a spool or pivot 60 (Figures 1–5) or 62 (Figures 6–8), forming a connection between the shoes. In order to permit the torque to be taken in reverse from this connection, pivot 60 is formed with a slot 64 for a fixed anchor or post 66 adjustably but fixedly clamped to the backing plate 22 by studs or other fastenings 68 passing through slots 70 in the backing plate. In Figures 3 and 4 an opening is shown in the end of post 66 through which a cotter pin may be inserted if desired.

When the drum is turning clockwise at the time the brake is applied, bracket 42 shifts to the right, and the right end of slot 64 engages post 66 to take the braking torque from shoe 26. Since shoe 24 can pull away from pivot 60 against the resistance of spring 58, it has at this time a considerable servo or applying action on shoe 26 through the cam 30 and its bearing 40.

In the arrangement of Figures 6–8, the braking torque at this time is taken through a stamping 72, of U-shaped section, having its rear part secured by bolts 74 to the backing plate, and formed with a finger 76 which projects into the path of pivot 62. Finger 72 extends into a recess in the end of shoe 24, having its open end facing pivot 62, and which may be formed, as shown in Figure 8, by spreading apart the two elements or stampings forming the shoe 24. In order to permit adjustment, bolts 74 may pass through slots 80 in the backing plate.

The shoes are shown positioned laterally, midway of their lengths, by stampings 82 riveted to the backing plate, and having at their ends U-section portions embracing the inner edges of the stiffening webs of the shoes. In order to prevent the shoes from swinging as a unit about bearing 40, when the brake is released, an auxiliary spring 84 holds shoe 26 in an idle position determined by its stamping or stop 82.

While two illustrative embodiments have been described in detail, it is not my intention to limit the scope of the invention to those particular embodiments, or otherwise than by the terms of the appended claims.

I claim:

1. A brake comprising, in combination, a drum, a pair of floating shoes having a direct pivotal connection and engageable with the drum, means for forcing the shoes against the drum, means at the unconnected end of one of the shoes for taking the torque of both shoes when the drum is turning in one direction, and means arranged adjacent the connected ends of the shoes and projecting into one of the shoes for taking the torque of at least one shoe when the drum is turning in the other direction.

2. A brake comprising, in combination, a drum, a plurality of floating connected shoes engageable with the drum, means for forcing the shoes against the drum, means at the unconnected end of one of the shoes for taking the braking torque when the drum is turning in one direction, and means projecting into one of the shoes adjacent its connected end for taking the braking torque when the drum is turning in the other direction.

3. A brake comprising, in combination, a drum, shoes within and engageable with the drum, a floating pivot connecting the shoes, a torque-taking stop between the unconnected ends of the shoes, and an auxiliary torque-taking stop projecting into one of the shoes adjacent its connected end.

4. A brake comprising, in combination, a drum, shoes within and engageable with the drum, an applying device, a floating pivot connecting the shoes, a bracket for the applying device which is shiftable in one direction and which takes the torque of the shoes in one direction of drum rotation, and auxiliary torque-taking means acting on the pivot.

5. A brake comprising, in combination, a drum, shoes within and engageable with the drum, an applying device, a floating pivot connecting the shoes, a bracket for the applying device which is shiftable in one direction and which takes the torque of the shoes in one direction of drum rotation, and auxiliary torque-taking means for taking the braking torque in the other direction of drum rotation.

6. A brake comprising, in combination, a drum, a friction device engageable with the drum, applying means for the friction device including a shaft, a support in which said shaft is journalled and which can shift in one direction and which is arranged to take the torque of the friction device when the drum is turning in the direction opposite to said shifting, and auxiliary means for taking the torque of the friction device when the drum is turning in the direction the support can shift.

7. A brake comprising, in combination, a drum, a friction device engageable with the drum, applying means for the friction device including a shaft and a one-lobed cam on the end of the shaft, a support in which said shaft is journalled and which can shift in the direction opposite to the thrust of said cam and which is arranged to take the torque of the friction device when the drum is turning in the direction opposite to said shifting, and auxiliary means for taking the torque of the friction device when the drum is turning in the direction the support can shift.

8. A brake comprising, in combination, a drum, a friction device engageable with the drum, and two torque-taking devices approximately 180° apart, one taking the torque of the entire friction device when the drum is turning in one direction and the other projecting into an opening in one of the shoes and taking the torque of at least part of the friction device when the drum is turning in the other direction.

9. A brake comprising, in combination, a drum, a friction device including shoes having adjacent separable ends and engageable with the drum, a floating pivot directly connecting the other ends of the shoes, and two torque-taking devices approximately 180° apart, one taking the braking torque from one of said ends when the drum is turning in one direction and the other taking the braking torque by direct engagement with said pivot when the drum is turning in the other direction.

10. A brake comprising, in combination, a drum, shoes engageable with the drum, a movable expanding device and a device for taking braking torque in one direction of drum rotation engaging the ends of the shoes on one side of the drum, a connecting device engaging the ends of the shoes on the opposite side of the drum, and a torque-taking device operative in the other direction of rotation and engaging the connecting device.

11. A brake comprising, in combination, a drum, shoes engageable with the drum, a movable expanding device and a device for taking braking torque in one direction of drum rotation engaging the ends of the shoes on one side of the drum, and a connecting device and a device for taking braking torque in the opposite direction of drum rotation engaging the ends of the shoes on the opposite side of the drum, said parts being so arranged that in one direction of drum rotation one shoe applies the other through the connecting device while in the other direction of drum rotation one shoe applies the other through the expanding device.

12. A brake comprising, in combination, a drum, an adjacent stationary support, a friction device within the drum having separable ends, a bracket having a bearing between said ends, one side of which bearing is engaged by one end of the friction device and the other side of which bearing is cut away, a shaft in the bearing having an applying device acting on the other end of the friction device through the cut-out side of the bearing, and means for mounting the bracket on the support in a manner permitting it to shift toward the end of the friction device engaging the bearing.

13. A brake comprising, in combination, a drum, a friction device within the drum having separable ends, a bearing between said ends, one side of which bearing is engaged by one end of the friction device and the other side of which bearing is cut away, and a shaft in the bearing having an applying device acting on the other end of the friction device through the cut-out side of the bearing.

14. A brake comprising, in combination, a drum, an adjacent stationary support, a friction device within the drum having separable ends, a bracket having a bearing between said ends, one side of which bearing is engaged by one end of the friction device and the other side of which bearing is cut away, a shaft in the bearing having an applying device acting on the other end of the friction device through the cut-out side of the bearing, and fastenings carried by the bracket and projecting through somewhat larger openings in the support, to permit the bracket to shift.

15. A brake comprising, in combination, a drum, floating shoes within the drum, a device for pivotally connecting the shoes and which is formed with a slot, and a stationary anchor member projecting into the slot.

16. A bracket having a journal-bearing sleeve part for a brake cam-shaft, which is cut away on one side only for a cam on said shaft.

17. A brake comprising shoes, a pivot connecting the shoes, at least one shoe having at one end a recess with the open end facing toward the pivot, and a torque-taking device projecting into the recess and engageable by the pivot.

18. A brake comprising shoes, a pivot connecting the shoes, at least one shoe being built up of elements secured together and spread apart at one end of the shoe to provide a recess with the open end thereof facing toward the pivot, and a torque-taking device projecting into the recess and engageable by the pivot.

19. A torque-taking device for a brake comprising a generally U-section stamping having one side constructed and arranged to be secured to a support, and having the other side formed with a finger arranged to project into the path of a brake part to take the braking torque therefrom.

20. A brake comprising a drum, shoes engageable with the drum, an applying device for the shoes, and a connecting device for the shoes yieldably permitting separation of the shoes, the brake including parts so arranged so that in one direction of drum rotation one shoe applies the other through the connecting device, and in the other direction of drum rotation one shoe applies the other through the applying device.

21. A brake comprising friction parts having a connecting pivot and an adjacent recess, in combination with an anchor member extending into said recess.

22. A brake comprising friction parts having a connecting pivot and an adjacent recess, in combination with an anchor member extending radially of the brake into said recess.

23. A brake comprising a floating pivot, a pair of shoes abutting said pivot, a spring holding said shoes against the pivot, and an anchor engageable with the pivot.

In testimony whereof, I have hereunto signed my name.

LUDGER E. LA BRIE.